US011123814B2

(12) United States Patent
Luck et al.

(10) Patent No.: US 11,123,814 B2
(45) Date of Patent: Sep. 21, 2021

(54) BATTERY POWERED COMPACT WIRE FEEDER

(75) Inventors: John Alan Luck, Appleton, WI (US); Stephen Paul Ferkel, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 309 days.

(21) Appl. No.: 13/427,353

(22) Filed: Mar. 22, 2012

(65) Prior Publication Data

US 2012/0241430 A1 Sep. 27, 2012

Related U.S. Application Data

(60) Provisional application No. 61/467,437, filed on Mar. 25, 2011.

(51) Int. Cl.
  *B23K 9/10* (2006.01)
  *B23K 9/133* (2006.01)
  *B23K 9/32* (2006.01)

(52) U.S. Cl.
  CPC ........... *B23K 9/1006* (2013.01); *B23K 9/133* (2013.01); *B23K 9/1333* (2013.01); *B23K 9/32* (2013.01)

(58) Field of Classification Search
  CPC .... B23K 9/327; B23K 9/1006; B23K 9/1333; B23K 9/32; B23K 9/122; B23K 9/124; B23K 9/125; B23K 9/173; B23K 9/295; B23K 9/0953; B23K 9/0956; B23K 9/095; B23K 9/1093; B23K 9/13; B23K 9/323; B23K 9/16; B23K 9/1056; B23K 9/1081; B23K 9/325; B23K 9/1336; B23K 9/133; B23K 9/167; B23K 9/296; B23K 3/063; B23K 9/1043; B23K 9/12; B65H 35/002; Y10S 242/916; Y10S 388/937; H02G 1/085; H02P 7/28; F17C 2205/0323; F17C 2270/0745; F17C 2205/0373;
  (Continued)

(56) References Cited

U.S. PATENT DOCUMENTS 2,710,902 A * 6/1955 Pilia ................. B23K 9/167
 219/74
3,070,057 A * 12/1962 Dezzani ............. B23K 3/0615
 226/127
(Continued)

FOREIGN PATENT DOCUMENTS

WO 0076709 A1 12/2000

OTHER PUBLICATIONS

International Search Report & Written Opinion of PCT/US2012/030278 dated Jul. 5, 2012.

*Primary Examiner* — Sang Y Paik
*Assistant Examiner* — Diallo I Duniver
(74) *Attorney, Agent, or Firm* — McAndrews, Held & Malloy, Ltd.

(57) ABSTRACT

A wire feeder that is powered at least partially by a battery is provided. The wire feeder includes a welding wire spool and a welding wire drive system for receiving welding wire from the spool and feeding the wire through a flexible conduit attached to an enclosure of the wire feeder. A motor of the wire feeder drives the welding wire drive system, powered at least in part by the battery. The wire feeder includes a battery receptacle for receiving the battery. In certain embodiments, the wire feeder may be attached to a body of a user via a harness system.

17 Claims, 7 Drawing Sheets

(58) Field of Classification Search
CPC ........ F17C 2250/043; F17C 2223/0123; F17C 2205/0126; F17C 2201/0109; F17C 2205/0111; F17C 2209/228; F17C 2205/0165; F17C 2223/035; F17C 2201/0119; F17C 2201/058; F17C 2205/0338; F17C 2270/0545
USPC .............. 219/137.42, 137.51, 137.7, 137.71, 219/125.12, 137 R, 137.63, 137.2, 74, 219/130.1, 75, 137 PS, 230, 136, 137.31, 219/133, 134, 132, 98; 242/370, 7.18, 242/54 R, 96, 564.4, 588.2, 916, 557; D22/137; 226/90, 127, 128, 129–133, 226/152, 156, 168, 177, 181, 187, 188, 226/91, 196
See application file for complete search history.

(56) References Cited

U.S. PATENT DOCUMENTS

| | | | | |
|---|---|---|---|---|
| 3,990,622 A * | 11/1976 | Schurman, Jr. | ...... | B23K 3/0615 219/242 |
| 4,138,048 A * | 2/1979 | Lemmon | ...... | B65H 35/002 226/127 |
| 4,206,862 A * | 6/1980 | DaCosta | ...... | B23K 9/1336 219/137.2 |
| 4,580,026 A * | 4/1986 | Stol | ...... | B23K 9/1093 219/136 |
| 4,780,594 A * | 10/1988 | Rothermel | ...... | B23K 9/124 219/136 |
| 4,793,541 A * | 12/1988 | Dravnieks | ...... | B23K 3/0615 219/229 |
| 4,932,581 A * | 6/1990 | Ohle | ...... | B23K 3/063 226/43 |
| 4,944,464 A * | 7/1990 | Zelenka | ...... | B23K 3/063 226/127 |
| 5,410,126 A * | 4/1995 | Miller et al. | ...... | 219/130.1 |
| 5,813,591 A * | 9/1998 | Quinn | ...... | B23K 3/063 226/127 |
| 5,839,642 A * | 11/1998 | Tait | ...... | B23K 3/063 228/41 |
| 5,998,758 A * | 12/1999 | Moser | ...... | B23K 26/04 219/121.63 |
| 6,066,834 A * | 5/2000 | Rebold | ...... | B23K 9/12 219/137.71 |
| 6,225,596 B1 | 5/2001 | Chandler et al. | | |
| 6,550,663 B2 * | 4/2003 | Poletaev | ...... | B23K 3/063 228/102 |
| 6,841,752 B2 * | 1/2005 | Ward | ...... | B23K 9/10 219/136 |
| 8,026,456 B2 * | 9/2011 | Achtner | ...... | B23K 9/133 219/137.2 |
| 2005/0103768 A1 * | 5/2005 | Ward | ...... | B23K 9/10 219/132 |
| 2005/0194487 A1 * | 9/2005 | Caamano | ...... | 242/390.8 |
| 2006/0207981 A1 * | 9/2006 | Diekmann | ...... | B23K 9/1336 219/137.2 |
| 2007/0257084 A1 * | 11/2007 | Carrier | ...... | B23K 9/10 228/44.3 |
| 2008/0116185 A1 * | 5/2008 | Luck | ...... | B23K 9/1062 219/132 |
| 2008/0156783 A1 * | 7/2008 | Vanden Heuvel | ..... | B23K 9/125 219/137.2 |
| 2009/0039064 A1 * | 2/2009 | Enyedy | ...... | B23K 9/12 219/132 |
| 2009/0057285 A1 * | 3/2009 | Bashore | ...... | B23K 9/32 219/130.1 |
| 2010/0051595 A1 * | 3/2010 | Diedrick et al. | ......... | 219/137 R |
| 2010/0314375 A1 | 12/2010 | Kaufman | | |
| 2010/0320183 A1 * | 12/2010 | Borchert | ...... | B23K 9/1043 219/130.1 |

* cited by examiner

BATTERY POWERED COMPACT WIRE FEEDER

CROSS REFERENCE TO RELATED APPLICATIONS

This application is a Non-Provisional of U.S. Provisional Patent Application No. 61/467,437, entitled "Battery Power Compact Wire Feeder", filed Mar. 25, 2011, which is herein incorporated by reference in its entirety.

BACKGROUND

This invention relates generally to wire feeders for welding systems. More specifically, this invention relates to a compact, battery powered wire feeder.

Welding systems generally include an electrode configured to pass an arc between a torch and a work piece, thereby heating the work piece to create a weld. In many systems, such as metal inert gas (MIG) welding and stick welding systems, the electrode is a consumable wire that melts into the weld to provide a filler material into the weld. In other words, a single wire serves both as an electrode and as the filler material. In contrast, other welding systems, such as tungsten inert gas (TIG) welding systems, employ a non-consumable tungsten electrode that is independent from the filler material. In other words, the TIG welding process does not melt the tungsten electrode into the weld forming on the work piece. Instead, a user generally holds the TIG torch with the tungsten electrode in one hand, while the user simultaneously and independently holds the filler material in another hand. The independent filler material is typically provided in a 36 inch long rod, which is manually delivered to the work piece, forming a weld that is approximately twelve inches in length. When the filler rod is almost entirely consumed in the welding process, the operator stops welding, discards the remaining stub of filler material, and begins welding again with a new filler rod. Unfortunately, this process of starting, stopping, and discarding unused filler material may result in an inefficient use of time and consumables throughout the welding process. In addition, the 36 inch long rods of filler material generally used in the welding process may offer limited flexibility to the user when the work piece is located in a relatively tight space.

BRIEF DESCRIPTION

In one embodiment, a welding wire feeder includes an enclosure. The enclosure includes a hub for receiving a welding wire spool and a welding wire drive system for receiving welding wire from the welding wire spool and feeding the welding wire through a flexible conduit attached to the enclosure. In addition, the enclosure includes a motor for driving the welding wire drive system and a battery receptacle. The motor is powered at least in part by a battery, and the battery receptacle is for receiving the battery.

In another embodiment, a cordless welding wire feeder system includes a hub for receiving a welding wire spool and a welding wire drive system for receiving welding wire from the welding wire spool and feeding the welding wire through a flexible conduit attached to the enclosure. In addition, the enclosure includes a motor for driving the welding wire drive system and a battery receptacle. The motor is powered at least in part by a battery, and the battery receptacle is for receiving the battery. The cordless welding wire feeder system also includes a harness system for attaching the welding wire feeder to a body of a user.

In another embodiment, a method for operating a welding wire feeder includes driving a welding wire drive system using a motor powered at least in part by a battery disposed in a battery receptacle of an enclosure of the welding wire feeder. The enclosure is configured to attach to a body of a user via a harness system. The method also includes feeding welding wire from a welding wire spool disposed in the enclosure through a flexible conduit attached to the enclosure using the welding wire drive system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Present embodiments are directed to systems and methods for providing a portable welding wire feeder that is powered at least in part by a battery. The wire feeder includes, among other things, a spool for providing a continuous supply of welding wire, a wire drive system for conveying the welding wire from the spool through a flexible conduit extending from the wire feeder, a motor for powering the wire drive system, and a battery receptacle for receiving the battery. The battery may be removable from an enclosure of the wire feeder, and the battery may be rechargeable. The wire feeder may also include a harness system for attaching the wire feeder to the body of a user, allowing the user to move around while welding using the continuous wire feed from the wire feeder. The harness system and battery operation may increase portability of the wire feeder, allowing greater flexibility for the user.

Figure 1:
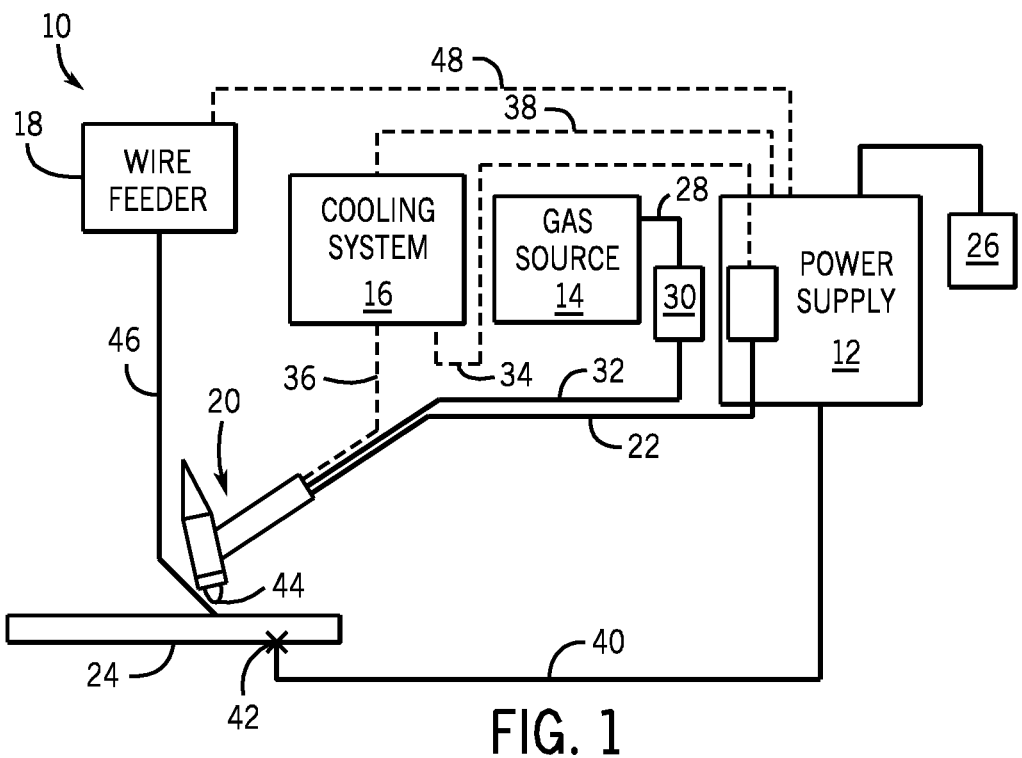
FIG. 1 is a block diagram of an embodiment of a welding system utilizing a battery powered portable welding wire feeder.

Turning now to the figures, FIG. 1 illustrates a tungsten inert gas (TIG) welding system 10 including a power supply 12, a shielding gas source 14, a cooling system 16, a wire feeder 18, and a welding torch 20. In the illustrated embodiment, the power supply 12 provides power to the welding torch 20 via a supply conduit 22. The power supply 12 may supply a direct current (DC) or alternating current (AC) to the welding torch 20 depending on the desired application. For example, an AC current may be suited for welding aluminum or magnesium, and a DC current may be suited for welding stainless steels, nickel, or titanium. In addition to matching the current to the material selection, the output of the power supply 12 may be varied to obtain desired weld characteristics. For example, a low AC frequency (e.g., 60 Hz) current may generate a wide arc with shallow penetration of a work piece 24, while a high AC frequency (e.g., 200 Hz) current may generate a focused arc with deeper penetration into the work piece 24.

In addition to the frequency of the current, the power supply 12 may vary the amperage of the current output to the welding torch 20. The setting for the amperage output by the power supply 12 may be adjusted by setting a knob or button on the power supply 12, or may be set by a remote control 26. For example, a welding system 10 may include a foot pedal remote control 26 that allows the operator to make current adjustments during welding by either holding down the foot pedal or feathering the foot pedal remote control 26 to vary the amperage. The remote control 26 may also include a finger tip trigger control, audible command, or other form of input to signal the power supply 12 to output a corresponding current.

In addition, the welding torch 20 may be supplied with a shielding gas from the shielding gas source 14. In general, the shielding gas may be supplied to the welding torch 20 and expelled from the welding torch 20 at the location of the weld. The shielding gas may be expelled immediately prior to striking the welding arc, throughout welding, and/or until shortly after the welding arc is extinguished. The shielding gas protects the welding area from atmospheric gases such as nitrogen and oxygen, which can cause fusion defects, porosity, and weld metal embrittlement. The shielding gas may also transfer heat from the welding electrode to the metal and may help to start and maintain a stable arc.

The shielding gas may be provided in a cylindrical container and delivered to the welding torch 20 via a conduit 28, a gas valve 30, and a supply conduit 32. A regulator on the gas source 14 may allow an operator to limit the pressure of the gas delivered to the gas valve 30 to obtain a desired flow rate. Further, the gas valve 30 may provide for stopping and starting the flow of the shielding gas to the welding torch 20 in coordination with other welding operations.

The welding system 10 may be provided with a cooling system 16 to reduce heat build-up in the welding torch 20. The cooling system 16 may take various forms including gas cooled and liquid cooled systems. The cooling system 16 may provide for circulation of the coolant via a coolant supply conduit 34, the supply conduit 22, and a coolant return conduit 36. The cooling system 16 may be powered from the power supply 12 via a coolant system power cord 38.

In general, the welding system 10 may provide for current flow via a work piece 24 to the power supply 12. For example, as depicted in FIG. 1, the welding system 10 may include a cable 40 that is secured to the work piece 24 via a work clamp 42. In this configuration, the current provided by the power supply 12 flows through the supply conduit 22 to the welding torch 20, flows across an arc from an electrode 44 to the work piece 24, and returns to the power supply 12 via the work clamp 42 and the cable 40.

The welding system 10 includes a wire feeder 18 that is powered at least partially by a battery, making the wire feeder 18 relatively portable. The wire feeder 18 may provide a continuous feed of welding wire 46 for use during the welding operation. This welding wire 46 is delivered toward the work piece 24 and deposited into the weld forming on the work piece 24 after being heated by the welding arc. Continuously fed welding wire 46 may offer an improvement to typically used filler material rods, as described above, that are fed manually to the weld, as the continuous feed reduces an amount of wasted filler material (e.g., a stub at the end of a filler rod) and an amount of time spent discarding and replacing the filler rod. In addition, the wire feeder 18, which is portable and capable of being decoupled from other components of the welding system 10, may offer an unprecedented degree of flexibility for the welding operator.

Although the wire feeder 18 is at least partly battery powered, a power connection 48 may extend from the wire feeder 18 to receive additional power from the power supply 12, or another outside power source. In certain embodiments, power received by the wire feeder 18 through the power connection 48 may be used to recharge a battery within the battery powered wire feeder system 18, or to supply a portion of the power used to operate the wire feeder 18. In certain embodiments, other connections may couple the wire feeder 18 with the power supply 12 or other components of the welding system 10 for communicating signals to control a wire feed speed for the wire feeder 18. As previously mentioned, the wire feeder 18 is at least partially battery operated. Because the wire feeder 18 is entirely battery operated, it may provide a portable, compact, and cordless system for feeding wire continuously to a weld site.

It should be noted that the welding system 10 illustrated in FIG. 1 is specific to tungsten inert gas (TIG) welding applications. However, the portable wire feeder 18, described in detail below, may be used in a variety of other welding contexts including, but not limited to, gas welding (e.g., oxyacetylene gas welding) and plasma welding. Similar to TIG welding, these welding applications generally involve a user manually feeding a filler material rod to the weld location with one hand while positioning the welding torch 20 with the other hand. Indeed, any welding application that typically employs consumable rods for depositing filler material into the weld may benefit from the wire feeder 18 described herein.

Figure 2:
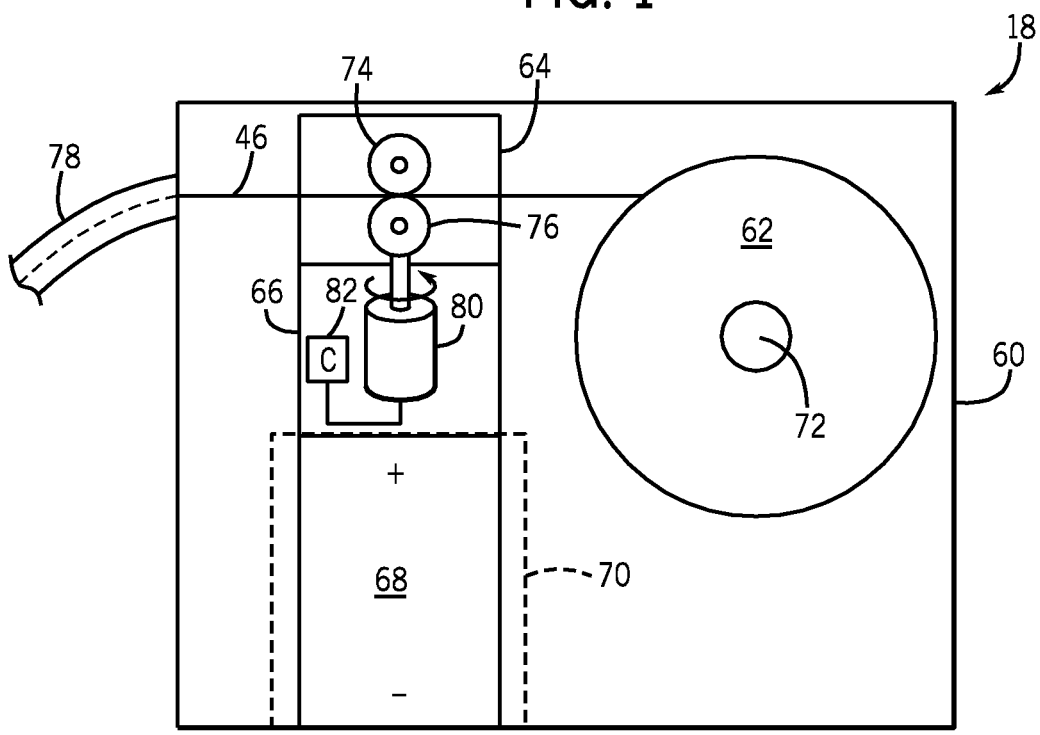
FIG. 2 is a diagrammatical representation of an embodiment of certain components of the wire feeder of FIG. 1.

FIG. 2 is a diagrammatical representation of an embodiment of certain components of the wire feeder 18 of FIG. 1. In the illustrated embodiment, the wire feeder 18 includes, among other things, an enclosure 60, a welding wire spool 62, a welding wire drive system 64, a motor 66, and a battery 68. The enclosure 60 may include a spool mount (e.g., a hub) 72 configured to receive the spool 62, wire drive 64, motor 66, and a battery receptacle 70 configured to receive the battery 68. Indeed, the battery 68, which may be a rechargeable battery, may be removed from the battery receptacle 70 of the enclosure 60 when recharging or replacement of the battery 68 is desired. Similarly, the spool 62 may also be removed from the enclosure 60 and replaced when the welding wire 46 of the spool 62 has been consumed. The spool 62, wire drive 64, motor 66, and battery 68 facilitate the continuous feeding of welding wire 46 through a flexible conduit 78 extending from the enclosure 60. An operator may grasp the flexible conduit 78 at an end distal to the enclosure 60 in order to manipulate the welding wire 46 toward the arc formed between the electrode 44 and the work piece 24.

The welding wire 46 is supplied by the welding wire spool 62, which may be mounted on the spool mount 72 within the enclosure 60. It may be desirable for the size, weight, and type of welding wire 46 on the spool 62 to conform to an industry standard. For example, the spool 62 may have a diameter of approximately four inches in order to maintain a weight of the wire feeder 18 that is light enough to be portable. Such welding wire spools 62 generally weigh approximately one pound for aluminum welding wire or approximately two pounds for steel, stainless steel, or nickel welding wire 46. The wire feeder 18 described herein may accommodate spools 62 of larger standard sizes as well, or may accommodate a custom sized spool 62 designed specifically for the wire feeder 18.

The illustrated welding wire drive system 64 includes a pair of feed wheels 74 and 76 that are configured to feed the welding wire 46 from the spool 62 through the flexible conduit 78 attached to the enclosure 60. The first feed wheel 74 may be an idler wheel configured to rotate relative to the enclosure 60 as the welding wire 46 moves, while the second feed wheel 76 may be a drive wheel configured to be turned by the motor 66 in order to urge the welding wire 46 toward the flexible conduit 78. In accordance with other embodiments of the wire feeder 18, the welding wire drive system 64 may include two or more pairs of feed wheels driven by the motor 66 in order to feed the welding wire 46.

The motor 66 may include, among other things, a motor drive 80 and control circuitry 82 for controlling operation of the motor drive 80, as discussed in detail below. The motor 66 is powered at least in part by the battery 68 located in the battery receptacle 70 of the enclosure 60. In certain embodiments, the motor 66 may receive supplemental power from the power supply 12 of the welding system 10, or any other external power supply, via the optional power connection 48. Indeed, the power connection 48 may receive power from the external power source (e.g., power supply 12) for recharging the battery 68 or providing additional power to drive the motor 66. Other embodiments may include a quick recharge feature for use when the battery 68 is rechargeable. Such a feature may include charging circuitry in communication with the power connection 48 to facilitate recharging of the battery 68 while the battery 68 is in the enclosure 60 of the wire feeder 18. In the illustrated embodiment, the enclosure 60 does not include the power connection 48, making the wire feeder system 18 entirely battery operated and cordless. This may increase the portability and flexibility of operation of the wire feeder 18.

Figure 3:
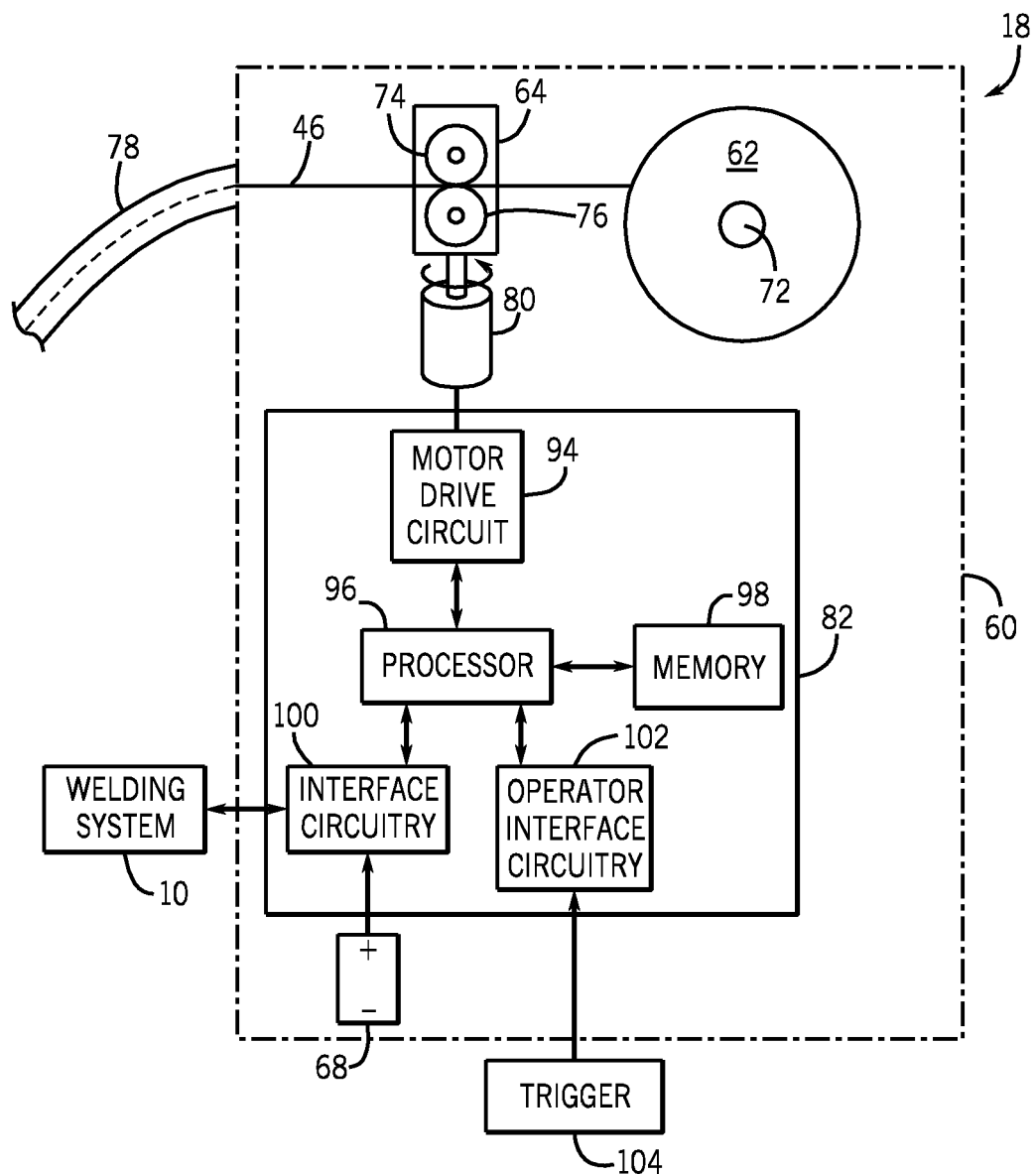
FIG. 3 is a block diagram of an embodiment of certain components of the wire feeder of FIG. 2, including various control circuitry components for controlling operation of the wire feeder.

FIG. 3 is a block diagram of an embodiment of certain components of the wire feeder 18, including various components of the control circuitry 82 for controlling operation of the wire feeder 18. As illustrated, the control circuitry 82 may include a motor drive circuit 94, a processor 96, a memory 98, interface circuitry 100, and operator interface circuitry 102. These components of the control circuitry 82 may be located within the motor 66, as shown in FIG. 2, or in one or more different locations within the enclosure 60 of the wire feeder 18. Certain circuitry components may communicate with components of the welding system 10 located generally outside the enclosure 60 in order to control a wire feed speed of the welding wire 46 exiting the wire feeder 18 toward the welding application.

The motor drive circuit 94 communicates with the processor 96 in order to operate the motor drive 80 at an appropriate speed for feeding the welding wire 46 supplied by the spool 62 through the flexible conduit 78. The processor 96 may determine the appropriate speed based on signals from the interface circuitry 100 and operator interface circuitry 102. In addition, the processor 96 may be operably coupled to the memory 98 in order to execute instructions for determining the appropriate wire feed speed based on these signals.

The interface circuitry 100 may communicate power supplied by the battery 68 to the processor 96 to power operations of both the processor 96 and the motor drive 80. The interface circuitry 100 also may convey additional power from certain components of the welding system 10 (e.g., the power supply 12 via the power connection 48) for operating the motor drive 80. Further, the interface circuitry 100 may transmit signals related to various operating parameters of the welding system 10 (e.g., current output of the power supply 12) in order to control wire feed speed. For example, when the power supply 12 provides or adjusts a current to the welding torch 20, a corresponding signal may be communicated to the processor 96 via the interface circuitry 100. Accordingly, a signal may be sent from the processor 96 to the motor drive circuit 94 for turning on or adjusting the speed of the motor drive 80. Signals from components of the welding system 10 that are separate from the wire feeder 18 may be communicated wirelessly or through a cable that plugs into the welding system 10 to activate the welding wire drive system 64. Wireless communication between the welding system 10 and the wire feeder 18 may allow a certain ease of manipulation of the wire feeder 18 relative to other welding system components, further increasing portability of the wire feeder 18.

The operator interface circuitry 102 may include user input devices of the wire feeder 18 for manually adjusting the wire feed speed. For example, the operator interface circuitry 102 may be linked to a control panel located on an outer surface of the enclosure 60. In other embodiments, the operator interface circuitry 102 may communicate signals from a trigger 104 positioned along the flexible conduit 78. Indeed, an operator may manipulate the welding torch 20 in one hand and the flexible conduit 78 for conveying the welding wire 46 in the other hand, activating the welding wire drive system 64 of the wire feeder 18 based on depression of the trigger 104 while continuously welding.

Figure 4:
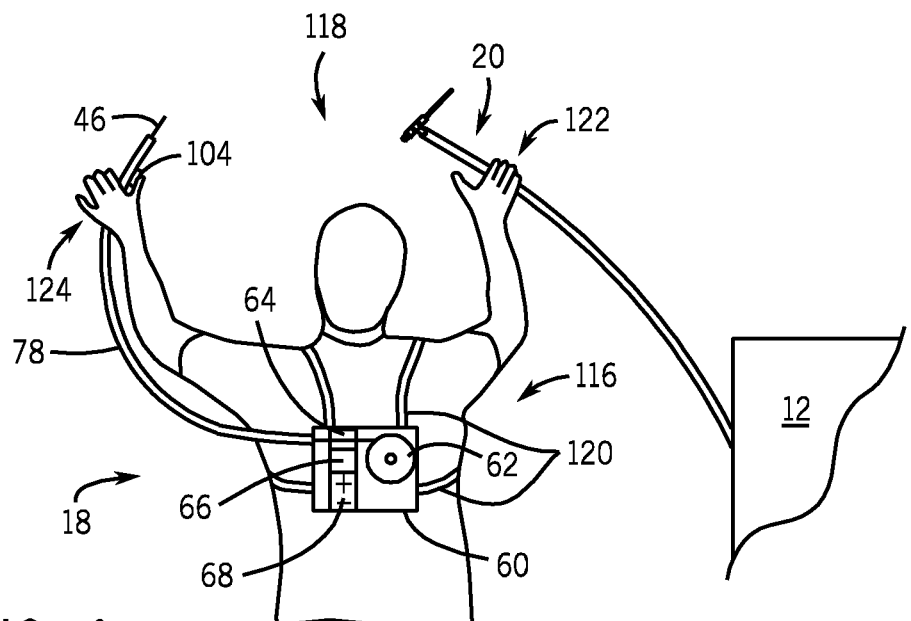
FIG. 4 is a perspective view of an embodiment of the wire feeder of FIG. 2 attached to the back of a user via a harness system such that welding wire is conveyed to the left side of the user.

FIG. 4 is a perspective view of an embodiment of the wire feeder 18 of FIG. 2 having the enclosure 60 attached to a torso 116 of a user 118 via a harness system 120 such that welding wire 46 is conveyed to the left side of the user 118. The harness system 120 of the wire feeder 18 may be used for attaching the enclosure 60 to a body of the user 118, which may include, among other things, the torso 116. In the illustrated embodiment, the harness system 120 includes straps through which the arms of the user 118 may be inserted. In this way, the portable wire feeder 18 may be worn as a backpack, secured to the back of the user's torso 116 so that the user 118 may maneuver the welding torch 20 in a right hand 122 and the flexible conduit 78 in a left hand 124. The previously discussed trigger 104 may be located along an end portion of the flexible conduit 78 such that the user 118 may control the speed of the welding wire 46 exiting the wire feeder 18 during a welding process. Since the wire feeder 18 is powered by the battery 68 and worn around the torso 116 of the user 118, the user 118 may manipulate both the welding torch 20 and the welding wire 46 exiting the flexible conduit 78 with relatively greater ease than possible using a larger bench-style wire feeder.

Figure 5:
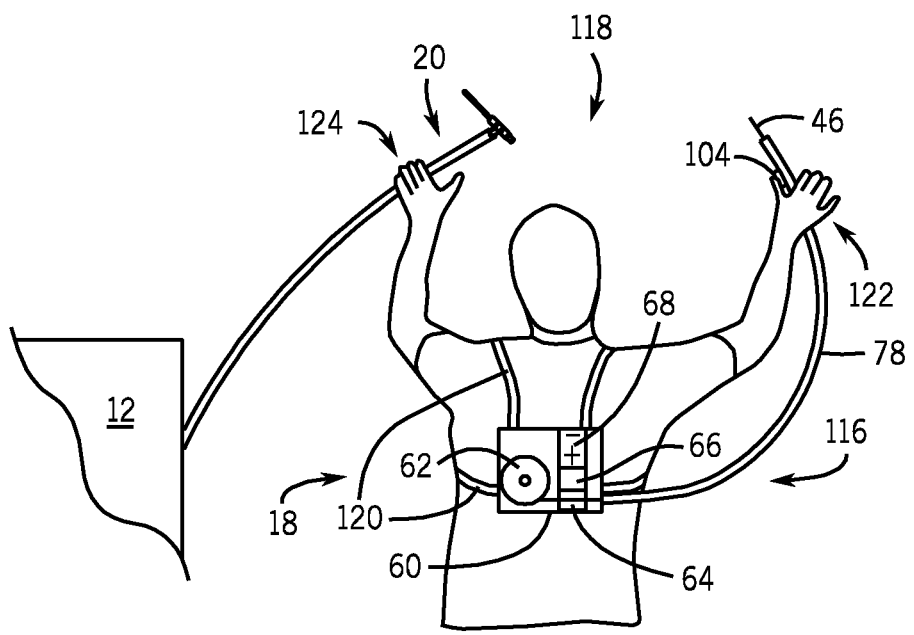
FIG. 5 is a perspective view of an embodiment of the wire feeder of FIG. 2 attached to the back of a user via a harness system such that welding wire is conveyed to the right side of the user.

It should be noted that other arrangements of components within the enclosure 60 of the wire feeder 18 may be possible, and other arrangements of the harness system 120 may be used to secure the enclosure 60 to the torso 116 of the user 118. Certain arrangements of the wire feeder 18 may be worn on the front or the back of the user 118, and some embodiments allow the user 118 to manipulate the welding wire 46 using either the right hand 122 or the left hand 124. For example, FIG. 5 shows the enclosure 60 attached to the user's back in order to convey the welding wire 46 through the flexible conduit 78 to the right hand 122 of the user 118. This arrangement may be especially useful for a left-handed user 118. Indeed, the wire feeder 18 of FIG. 5 may be the wire feeder 18 of FIG. 4 rotated 180 degrees. In other words, the wire feeder 18 and associated harness 120 may be easily reversible in certain embodiments. For example, the harness system 120 may be removed from the user 118, the entire wire feeder 18 turned 180 degrees, and the harness system 120 replaced on the user 118 to switch between these different arrangements.

Figure 6:
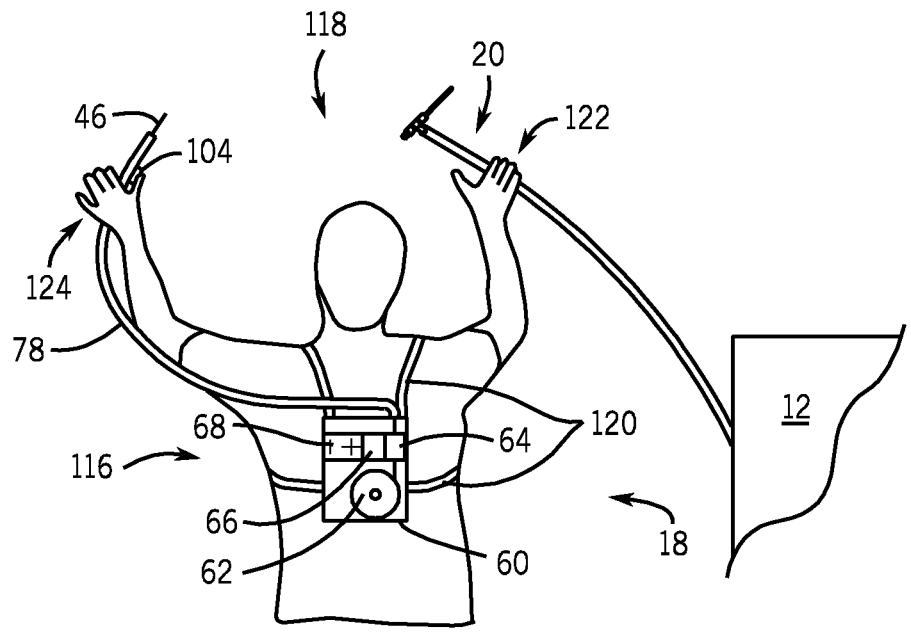
FIG. 6 is a perspective view of an embodiment of the wire feeder of FIG. 2 attached to the back of a user via a harness system such that welding wire is conveyed upward from the wire feeder.

FIG. 6 is a perspective view of an embodiment of the wire feeder 18 of FIG. 2 attached to the back of the user 118 via the harness system 120 such that welding wire 46 is conveyed upward from the enclosure 60 through the flexible conduit 78. This configuration of the harness system 120 relative to the enclosure 60 and components internal to the enclosure 60 may allow the user 118 to manipulate the flexible conduit 78 using the right hand 122 or the left hand 124 without removing the enclosure 60 from the user's torso 116. It should be noted that the battery 68, the motor 66, the welding wire drive system 64, and the spool 62 may be arranged in the enclosure 60 in any suitable configuration for directing the welding wire 46 from the enclosure 60 through the flexible conduit 78 in an upward direction.

Figure 7:
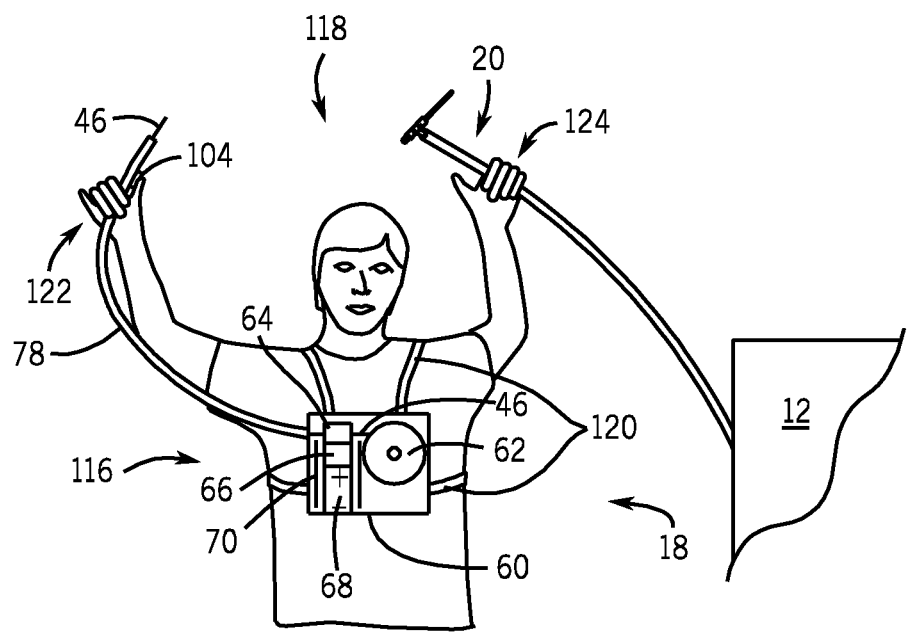
FIG. 7 is a perspective view of an embodiment of the wire feeder of FIG. 2 attached to the front of a user via a harness system such that the welding wire is conveyed to the right side of the user.

FIG. 7 illustrates the wire feeder 18 having the enclosure 60 attached to a front side of the user's torso 116. The wire feeder 18 in the illustrated embodiment may be the same wire feeder as shown in either or both of FIGS. 4 and 5, attached via the harness system 120 to the user's front instead of the user's back. This may allow the user 118 to manipulate the welding wire 46 with the right hand 122 while maintaining the orientation of internal components of the wire feeder 18 as shown in FIG. 4.

Figure 8:
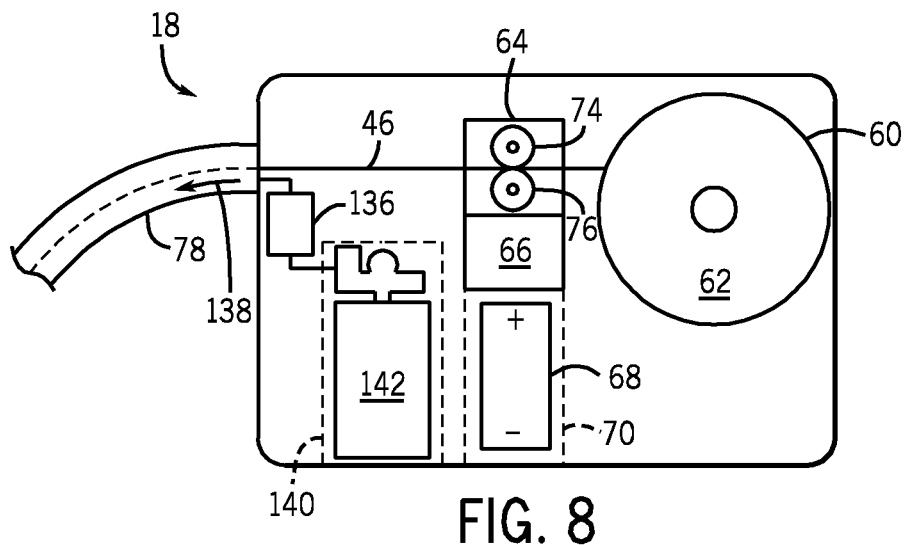
FIG. 8 is a block diagram of an embodiment of the wire feeder of FIG. 2 including a shielding gas flow control system for conveying shielding gas with the welding wire.

FIG. 8 is a block diagram of an embodiment of the wire feeder 18 including a shielding gas flow control system 136 for conveying shielding gas 138 through the flexible conduit 78 along with the welding wire 46. This may be useful for routing the shielding gas 138 through the flexible conduit 78 to shield the welding wire 46 from contaminants as the welding wire 46 is melted onto the work piece 24. This shielding gas flow control system 136 may provide the shielding gas 138 to the weld in addition to or in lieu of shielding gas supplied through the welding torch 20. In the illustrated embodiment, the enclosure 60 includes a gas cylinder receptacle 140 for receiving a shielding gas cylinder 142, and the shielding gas flow control system 136 is designed to receive the shielding gas 138 from the shielding gas cylinder 142 when the shielding gas cylinder 142 is inserted into the shielding gas cylinder receptacle 140. In certain embodiments, the shielding gas flow control system 136 may control the amount of shielding gas 138 delivered through the flexible conduit 78 (e.g., using flow control valves) based on the speed of the motor drive 80, as determined by the control circuitry 82 of the wire feeder 18. The shielding gas cylinder 142 may be removed from the shielding gas cylinder receptacle 140 and replaced with another shielding gas cylinder 142 when the shielding gas 138 is depleted. The shielding gas 138 may be a similar or different inert gas (e.g., argon) than the shielding gas provided to the welding torch 20 by the gas source 14. Furthermore, the shielding gas flow control system 136 may receive the shielding gas 138 from the gas source 14 in order to deliver the shielding gas 138 through the flexible conduit 78.

Figure 9:
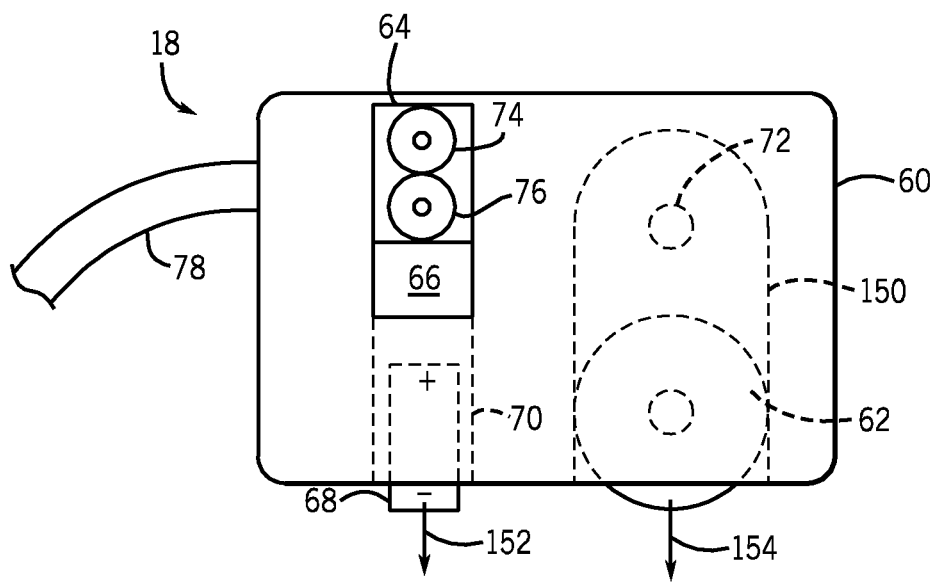
FIG. 9 is a block diagram of an embodiment of the wire feeder of FIG. 2 showing the removal of certain components from the wire feeder.

FIG. 9 is a block diagram of an embodiment of the wire feeder 18 showing the removal of certain components from the enclosure 60. It may be desirable to remove such components as the welding wire spool 62 and/or the battery 68 from the enclosure 60 of the portable wire feeder 18. As the welding wire drive system 64 conveys the welding wire 46 from the spool 62 through the flexible conduit 78, the spool 62 may eventually empty of the welding wire 46. At this point, a new welding wire spool 62 may be inserted into the enclosure 60 to supply the welding wire 46. To accommodate this, a spool receptacle 150 may be located in the enclosure 60 to allow for insertion and/or removal of the spool 62.

Likewise, it may be desirable for the battery 68 to be removed from the enclosure 60 for battery replacement or recharging (if the battery 68 is rechargeable). The illustrated embodiment shows both the battery 68 and the spool 62 being removed from their respective receptacles 70 and 150. Arrows 152 and 154 indicate downward directions in which the battery 68 and the spool 62, respectively, may be lowered from the enclosure 60. The enclosure 60 may include one or more covers that are hinged or removable to facilitate removal of the battery 68, the spool 62, and other components (e.g., the shielding gas cylinder 142 if present) from the enclosure 60. In certain embodiments, such covers may each feature a quick release mechanism, such as a snap fit feature, to allow the user 118 or someone else to easily open the cover(s) to remove the spool 62 and/or the battery 68. It should be noted that the enclosure 60 may be arranged to allow removal of these internal components in other directions; however, removal through the bottom of the enclosure 60 may enable the user 118 to remain wearing the wire feeder 18 on the user's torso 116 while someone else replaces the component(s). In addition, the process of removing the spool 62 from the enclosure 60 may include additional steps such as removing the spool 62 from the spool mount 72 upon which the spool 62 is situated during wire feeder operation.

Figure 10:
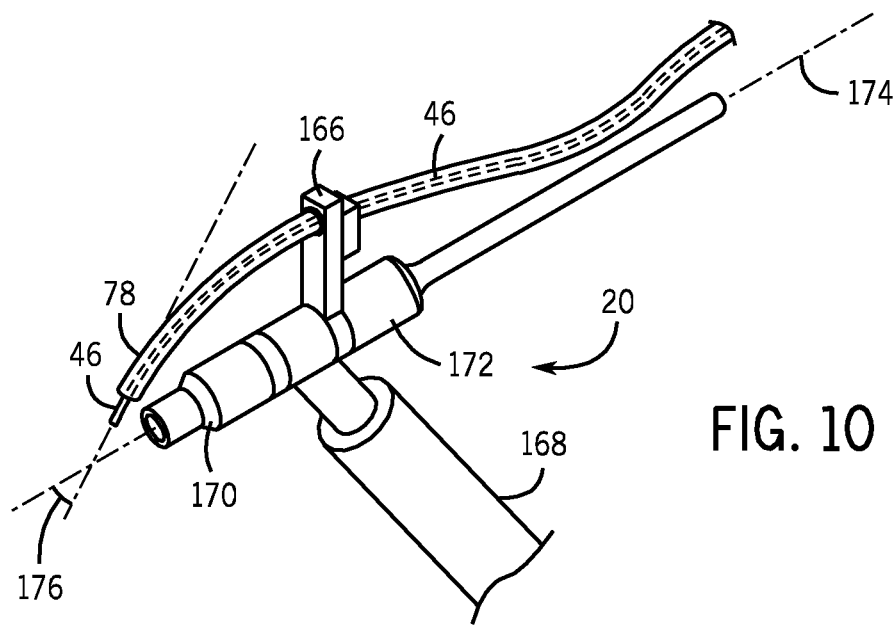
FIG. 10 is a perspective view of an embodiment of an attachment mechanism used to attach a flexible conduit of the wire feeder of FIG. 2 to a welding torch of a separate welding system.

FIG. 10 is a perspective view of an embodiment of an attachment mechanism 166 used to attach the flexible conduit 78 of the wire feeder 18 to the welding torch 20. The attachment mechanism 166 may be part of the flexible conduit 78, an integral component of the welding torch 20, or a separate component that may be selectively attached to both the flexible conduit 78 and the welding torch 20. In the illustrated embodiment, the welding torch 20 includes a torch handle 168, a torch nozzle 170, and a back cap 172. The illustrated attachment mechanism 166 is attached to the welding torch 20 near the handle 168, between the nozzle 170 and back cap 172, but in other embodiments, the attachment mechanism 166 may attach at different points along the welding torch 20.

In some embodiments, the attachment mechanism 166 may include a quick release feature that allows the flexible conduit 78 to be easily engaged or disengaged with the welding torch 20 when desired. During welding operations, an operator may desire to reorient the welding torch 20 relative to the work piece 24 in order to access the weld site. To accommodate this reorientation of the welding torch 20, it may be desirable for the attachment mechanism 166 to allow a corresponding adjustment of the orientation of the flexible conduit 78 relative to the welding torch 20. For example, the attachment mechanism 166 may rotate relative to an axis 174 of the welding torch 20 as it attaches the flexible conduit 78 to the welding torch 20. This would allow an angle 176 between the flexible conduit 78 and the welding torch 20 to be adjusted so that the flexible conduit 78 remains attached to the welding torch 20 throughout the welding process, even as the welding torch 20 is repositioned relative to the work piece 24.

Figure 11:
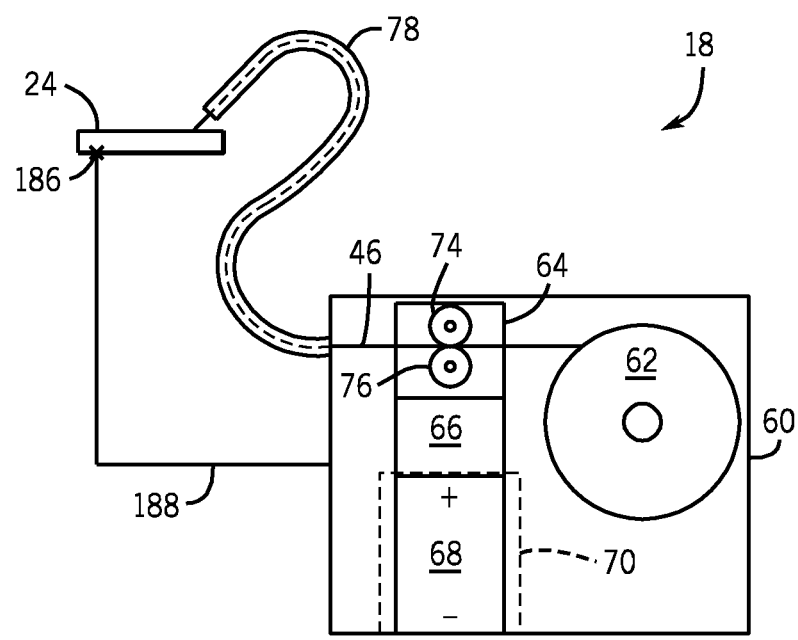
FIG. 11 is a diagrammatical representation of the wire feeder of FIG. 2 including a return lead extending from an enclosure of the wire feeder to a work piece.

FIG. 11 is a diagrammatical representation of the wire feeder 18 feeding the welding wire 46 through the flexible conduit 78 in a hot wire mode. That is, the wire feeder 18 supplies a charge carrying welding wire 46 to the work piece 24. The current flowing through the welding wire 46 heats the wire to a relatively higher temperature than possible without the current, allowing the welding wire 46 to be deposited more quickly on the work piece 24 to make the welding process more time efficient. In order to facilitate the current flowing through the welding wire 46, the wire feeder 18 may include a return lead 186 extending from the enclosure 60 to the work piece 24 via a cable 188. The wire feeder 18 may include a relatively small power source connected to both the welding wire 46 and the return cable 188. This power source may be the same battery 68 used to power the motor 66 for feeding the welding wire 46, or a separate power source. As the welding wire 46 is brought into contact with the work piece 24, a loop closes between the cable 188, work piece 24, welding wire 46, and power source, allowing the current to flow through and heat the welding wire 46. Thus, the wire feeder 18 may support hot wire welding or cold wire welding.

It should be noted that the return lead 186 may be a clamp similar to the work clamp 42 of FIG. 1, extending from the enclosure 60 via the cable 188 and fixed to the work piece 24 throughout the welding operation. In other embodiments, however, the return lead 186 extending from the enclosure 60 may be selectively brought into contact with the work piece 24 during welding. For example, the return lead 186 may be attached to a glove worn by the user 118 in order to allow the user 118 greater flexibility in positioning a point of contact between the return lead 186 and the work piece 24.

Figure 12:
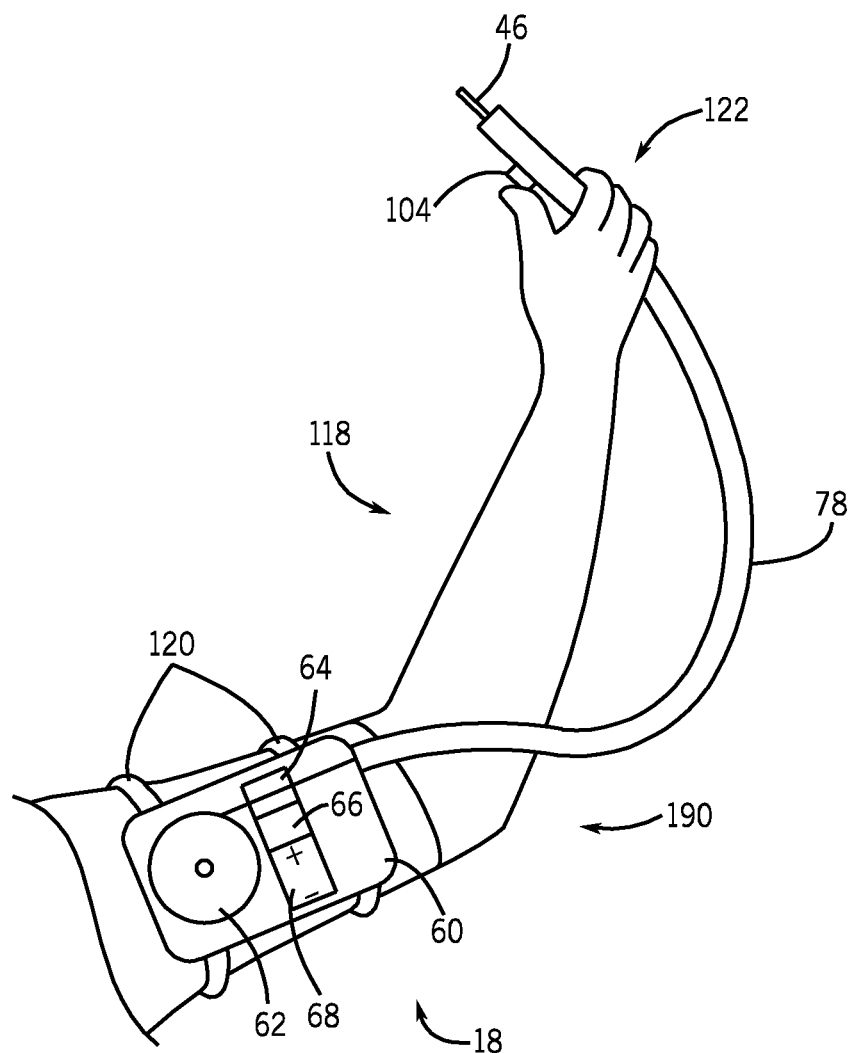
FIG. 12 is a perspective view of an embodiment of the wire feeder of FIG. 2 attached to an arm of a user via a harness system.

FIG. 12 is a perspective view of an embodiment of the wire feeder 18 of FIG. 2 attached to an arm 190 of the user 118 via the harness system 120. As previously mentioned, the harness system 120 may be used for attaching the enclosure 60 of the wire feeder 18 to a body, which may include the torso 116, the arm 190, or other body parts of the user 118. Attaching the wire feeder 18 to the arm 190 may be beneficial for supplying a continuous feed of the welding wire 46 toward the hand (e.g., the right hand 122) of the arm 190 due to the close proximity of the enclosure 60 to the right hand 122. As a result, the wire feeder 18 may provide a continuous feed of the welding wire 46 for use in a welding operation, while enabling the user 118 to manipulate the welding wire 24 and other welding equipment with an unprecedented degree of flexibility.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A portable welding wire feeder, comprising:
an enclosure having a weight and dimensions suitable to be held within a single hand of an operator, wherein the enclosure comprises:
   a hub for receiving a welding wire spool no larger than four inches in diameter;
   a welding wire drive system for receiving welding wire from the welding wire spool and feeding the welding wire through a flexible conduit attached to the enclosure, wherein the entire flexible conduit is independently movable and separate from a welding torch that consumes the welding wire during a welding operation as the welding wire is fed through the flexible conduit during the welding operation, wherein the enclosure is physically separate from a welding torch body and a welding torch handle of the welding torch;
   a motor for driving the welding wire drive system, wherein the motor is powered entirely by an integrated battery;
   a control circuit, the control circuit comprising an interface circuit in electrical communication with a separate welding power supply connected to the welding torch, wherein the interface circuit is configured to receive a control signal from the separate welding power supply connected to the welding torch, and wherein the control circuit controls the motor speed in response to the control signal;
   a battery receptacle for receiving the integrated battery;
   a cable with a clamp to complete a preheating circuit between the wire and the workpiece resistively heating the wire independently of a weld, the preheating circuit powered by the integrated battery;
   a harness system that includes one or more straps configured to secure the welding wire feeder to a torso, a leg, or an arm of a user by surrounding the torso, the leg, or the arm with the one or more straps; and
   a trigger coupled to a distal end of the flexible conduit opposite the enclosure, wherein the welding wire drive system is activated upon depression of the trigger.

2. The welding wire feeder of claim 1, the flexible conduit is configured to direct the flow of a shielding gas.

3. The welding wire feeder of claim 1, wherein the control signal is received from the separate welding power supply wirelessly.

4. The welding wire feeder of claim 1, wherein the enclosure comprises a power connection for receiving power from an external power source.

5. The welding wire feeder of claim 1, wherein the enclosure comprises a shielding gas flow control system for receiving shielding gas and delivering the shielding gas through the flexible conduit.

6. The welding wire feeder of claim 5, wherein the enclosure comprises a shielding gas cylinder receptacle for receiving a shielding gas cylinder, wherein the shielding gas flow control system receives the shielding gas from the shielding gas cylinder when the shielding gas cylinder is inserted into the shielding gas cylinder receptacle.

7. The welding wire feeder of claim 1, comprising an attachment mechanism for attaching the flexible conduit to the welding torch of the separate welding power supply.

8. The welding wire feeder of claim 1, wherein the welding wire spool is removable from the enclosure and replaceable.

9. The welding wire feeder of claim 1, wherein the cable permits an electrical current to flow from the integrated battery through the welding wire and the workpiece and then back to the integrated battery through the cable in a closed circuit to increase a temperature of the welding wire prior to being consumed by the welding torch during the welding operation.

10. A welding wire feeder system comprising:
a separate welding power supply;
a battery powered portable compact welding wire feeder, wherein the wire feeder is configured to be removably coupled to the separate welding power supply, comprising:
a hub for receiving a welding wire spool;
a welding wire drive system for receiving welding wire from the welding wire spool and feeding the welding wire through a flexible conduit attached to an enclosure of the welding wire feeder, wherein the entire flexible conduit is independently movable and separate from a welding torch that consumes the welding wire during a welding operation as the welding wire is fed through the flexible conduit during the welding operation, wherein the welding wire feeder is physically separate from a welding torch body of the welding torch and a welding torch handle of the welding torch;
a control circuit configured to receive a control signal via an interface circuit from the separate welding power supply connected to the welding wire feeder and the welding torch, wherein the separate welding power supply is configured to generate the control signal based on adjustments to a current output to the welding torch in response to a user input;
a motor for driving the welding wire drive system, wherein the motor is powered entirely by an integrated battery;
a battery receptacle for receiving the integrated battery; and
a cable with a clamp to complete a preheating circuit between the wire and the workpiece resistively heating the wire independently of a weld, the preheating circuit powered by the integrated battery; and
a harness system that includes one or more straps configured to secure the welding wire feeder to a torso, a leg, or an arm of a user by surrounding the torso, a leg, or an arm with the one or more straps.

11. The welding wire feeder system of claim 10, wherein the control signal is transmitted by and received from the separate welding power supply wirelessly.

12. The welding wire feeder system of claim 10, wherein the welding wire feeder comprises a shielding gas flow control system for receiving shielding gas and delivering the shielding gas through the flexible conduit.

13. The welding wire feeder system of claim 12, wherein the welding wire feeder comprises a shielding gas cylinder receptacle for receiving a shielding gas cylinder, wherein the shielding gas flow control system receives the shielding gas from the shielding gas cylinder when the shielding gas cylinder is inserted into the shielding gas cylinder receptacle.

14. The welding wire feeder system of claim 10, comprising an attachment mechanism for attaching the flexible conduit to the welding torch of the separate welding power supply.

15. The welding wire feeder of claim 1, wherein the separate welding power supply is configured to generate the control signal based on adjustments to a current output to the welding torch in response to a user input.

16. The welding wire feeder of claim 15, wherein the separate welding power supply is connected to a remote foot pedal control configured to adjust a current output from the separate welding power supply in response to an input from the operator.

17. The welding wire feeder system of claim 10, wherein the welding wire feeder system has a weight and dimensions to be held within a single hand of an operator.

* * * * *